Feb. 25, 1936.  R. S. STUBBS  2,032,029
DIRECTION INDICATOR
Filed July 14, 1932  2 Sheets-Sheet 1
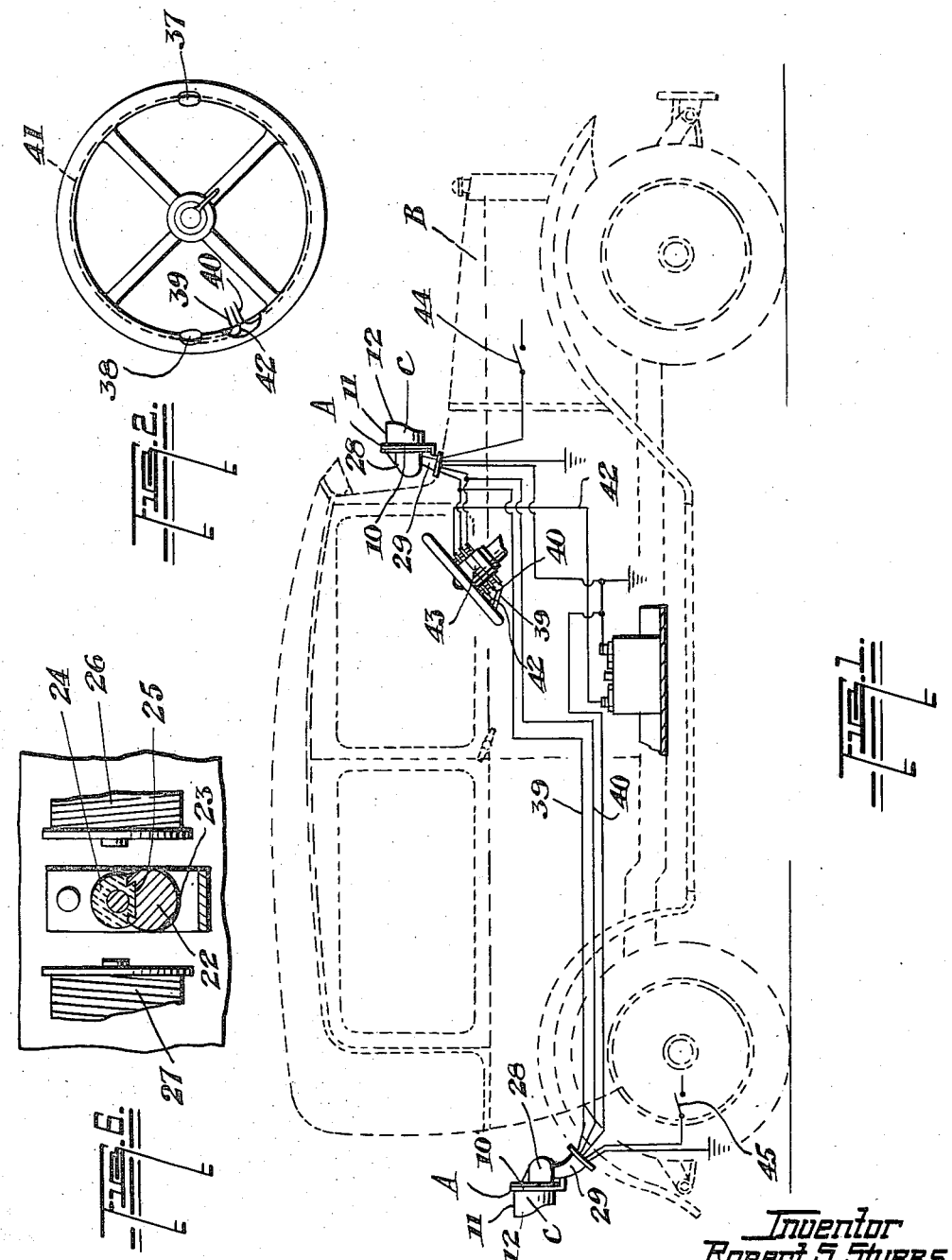

Feb. 25, 1936.  R. S. STUBBS  2,032,029
DIRECTION INDICATOR
Filed July 14, 1932  2 Sheets-Sheet 2
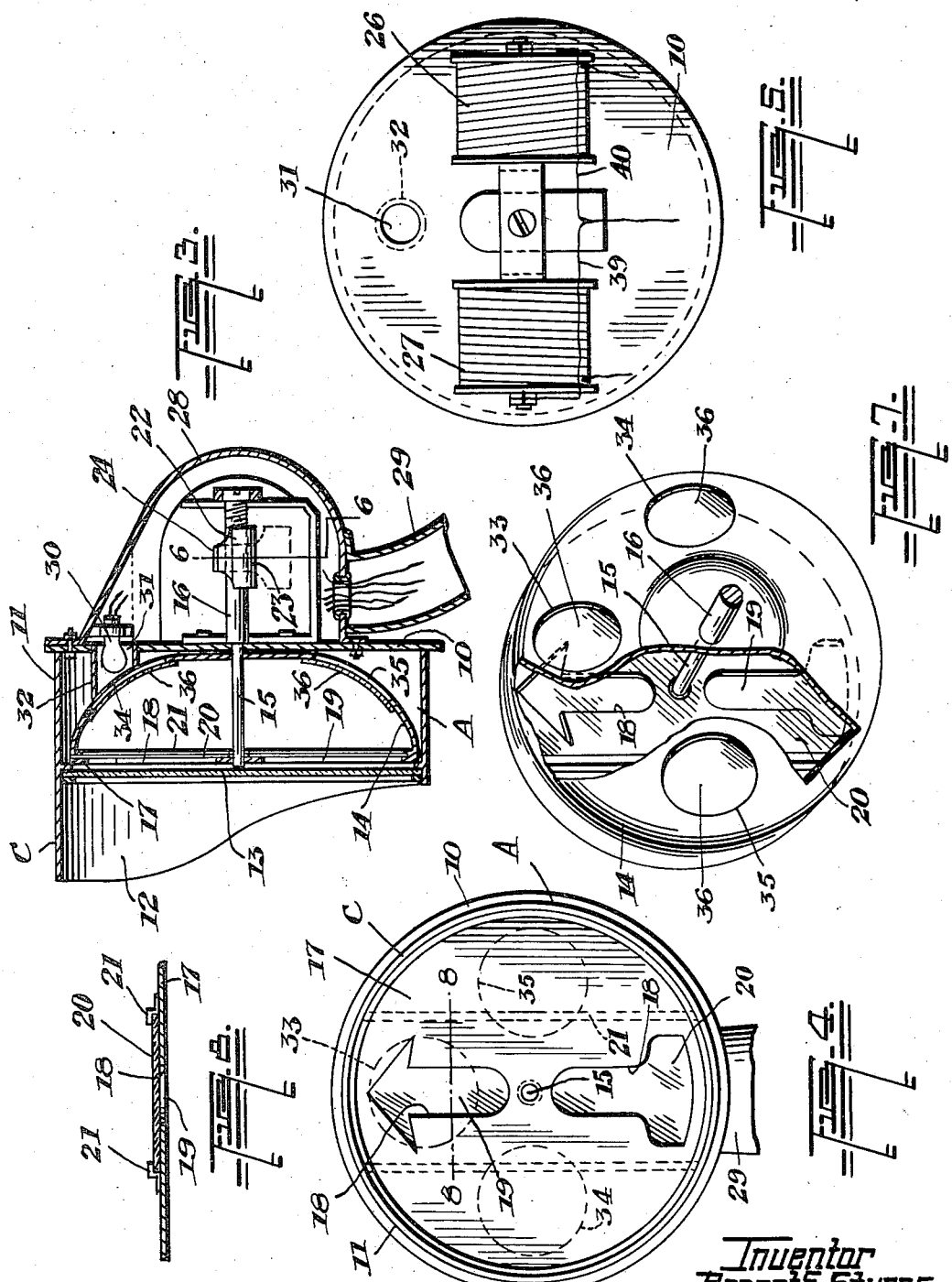
Inventor
Robert S. Stubbs.

Patented Feb. 25, 1936

2,032,029

UNITED STATES PATENT OFFICE 2,032,029

DIRECTION INDICATOR

Robert Samuel Stubbs, Hanna, Alberta, Canada

Application July 14, 1932, Serial No. 622,519½

6 Claims. (Cl. 177—337)

This invention relates to direction indicators and an object of the invention is to provide a direction indicator of very simple construction which will immediately respond to control and in which the parts are few so that it is not liable to go out of repair.

A further object of the invention is to provide an indicator of this character in which the indicating member will be illuminated in different colours according to the position it assumes.

A further object of the invention is to provide an indicator of this character which is directly controlled from the steering wheel of the vehicle.

A further object of the invention is to provide a structure which can be manufactured economically and readily installed upon the vehicle.

With these and other objects in view the invention consists essentially of a casing carrying a rotary indicator member which is carried by a rotary housing and controlled by electrical operating means housed at the rear of the casing, with the provision in connection with the rotary housing of means for illuminating the indicating member in different colours according to the different positions to which the indicating member is operated, as more fully described in the following specification and illustrated in the accompanying drawings which form part of the same.

In the drawings, Figure 1 is a diagrammatic side elevation of a vehicle showing the direction indicator mounted thereon and illustrating the circuit through which the indicators are operated.

Figure 2 is a plan view of the steering wheel, illustrating the switch for controlling the electric circuits.

Figure 3 is a transverse sectional elevation of the indicator.

Figure 4 is a plan view of the front of the indicator.

Figure 5 is a plan view of the rear of the indicator casing with the housing for the operating mechanism removed, illustrating the mounting of the electromagnets with respect to the indicator shaft.

Figure 6 is a fragmentary view of the electromagnets in relation to the weighted armature mounted on the indicator shaft.

Figure 7 is a perspective view of the rotary housing with part of the rear wall broken away, showing the indicating member on the front of the housing and the coloured panel position in the rear of the housing.

Figure 8 is a section taken on the line 8—8 of Figure 4.

Referring more particularly to the drawings, A designates a direction indicator unit as a whole which is designed to be mounted on the front and rear of a vehicle B. The direction indicating unit A, according to the present invention, is preferably constructed with a casing C which includes the base plate 10 having secured thereto the cylindrical casing 11, which may be provided with a vizor or the like 12. The front of the casing 11 is left open, being preferably covered over with a clear glass panel 13 so that the interior of the casing is readily visible.

Within the interior casing is mounted a rotary unit 14 in the form of a housing, this unit being rigidly mounted on the shaft 15 which is journalled through the base plate 10. The shaft 15 protrudes rearwardly from the base plate 10 in the form of an extension 16 which may be covered with a suitable sleeve. The rotary housing or unit 14 has its front face covered with an opaque plate 17 which is cut out as at 18 to form an indicating member 19 and the cut out portions are preferably covered by a translucent glass slide or plate 20 which may be held by the opaque plate 17 by means of the guides 21, as illustrated in Figure 8.

The extension 16 of the shaft 15 has mounted thereon a weighted armature 22. The form of this armature is illustrated in Figures 3 and 6. I have found that this armature should be formed with a lower arcuate surface 23 so that it will operate efficiently to turn the shaft 15 to three predetermined positions during the operation of the direction indicator. The armature according to the present construction is carried by the insulating sleeve member 24 which is rigidly secured to the extension 16 of the shaft 15, the armature connecting with said sleeve by means of the dovetailed tongue and groove connection 25.

On the back of the base plate 10 are mounted electromagnets 26 and 27, as clearly illustrated in Figures 5 and 6, the magnets being positioned in alignment, spaced apart from one another on each side of the extension 16 and armature 22 carried thereby. It is apparent, therefore, that when either of these electromagnets is energized the armature 22 will be attracted towards and held in this attracted position by the energized electro-magnet and therefore the shaft 15 will be rotated to position the rotary housing or unit 14 in a corresponding position. Each magnet when energized will attract the armature so as to place the indicating member 19 in a position indicating a right or left turn according to which electro-magnet is energized and when it is de-energized the weight and shape of the armature is such as to return the shaft 15 to its normal position which is such as to hold the indicating member 19 in a vertically disposed position with the arrow pointing upwards, as viewed in Figure 4.

It is apparent, therefore, that the operating means is very simple and it will be observed that the operation of the rotary housing or unit through the shaft 15 is effected in a direct manner since the armature is mounted directly on the extension 16 of this shaft and the shaft is turned directly and positively when either of the electro-magnets is energized.

The electro-magnets and the armature, or otherwise the operating mechanism, are housed by the closure member 28 which is secured to the base plate 10 and a suitable standard 29 may be attached to the closure 28 to mount the device on a vehicle. However, any form of closure and standard may be employed.

A salient feature of the invention resides in the method of clearly indicating the intended signal. Within the closure 28 is mounted a light 30 which is designed to protrude through the base plate 10 by means of any suitable orifice 31. According to the preferred construction, a vizor or shield 32 is mounted on the base plate 10 surrounding the orifice 31 so as to project the light rays to concentrate on one specific area. Co-operating with the light 30 are a plurality of openings 33, 34 and 35 formed in the rear of the rotary housing 14, each of these openings corresponding to predetermined set positions of the indicating member 19. The opening 33 corresponds with the normal position of this indicating member, as shown in Figure 4, whereas the openings 34 and 35 correspond respectively with the position of the indicating member 19 when it is moved to indicate a left or right turn.

The openings 33, 34 and 35 are provided with different coloured glass panels 36, the panels in the openings 34 and 35 being coloured red and green respectively so that a red light will show on the left turn, which is the most dangerous, and a green light will show on the right turn, while the panel in the opening 33 may be left clear or coloured to appropriately illuminate the indicating member when held in normal position.

The positions described are those assumed by the indicator when on the front of a vehicle but the indicating unit placed on the rear of the vehicle will have these positions reversed: that is the opening 34 will indicate a right turn, whereas the opening 35 will indicate a left turn.

It is apparent from the foregoing, therefore, that the light 30 will flood the rotary housing 14 with a different coloured light to so illuminate the indicator, when the indicating member is in one of its three positions and the intention of the driver of the vehicle is therefore very positively signalled.

The direction indicator is controlled by suitable switches positioned to be readily operable by the driver of the vehicle. It is preferred, however, to mount these switches on the steering wheel and this is an important provision in that the operation of the signal is effected without it being necessary for the driver to let go the steering wheel, which might otherwise tend towards letting the car get out of control.

In Figure 2 the switches are illustrated, switch 37 controlling the operation of the indicating member to the right and switch 38 to the left. The lead wire 39 connects with the switch 38 and lead 40 with switch 37, the connecting wire 41 being disposed between the two switches to complete the circuit through the lead 42, regardless of which switch is operated, the lead 42 being ultimately connected to the positive terminal of the battery while the leads 39 and 40 connect respectively with the electro-magnets 26 and 27, the connections from the steering wheel being effected preferably through a series of collector rings 43. The other connections of the electro-magnets are made to ground to complete the circuit in the usual way, whereas the light 30 is connected in the ordinary light circuit of the vehicle and operated through the light switch 44, the whole circuit being controlled as usual through the ignition switch 45.

If it is desired a similar indicating member constructed on a very small scale could be positioned on the dashboard of the car so that the operator could readily make certain that the direction indicators are pointing in the direction to which he had operated it. This additional indicator, it is apparent, may readily be incorporated in the circuit to operate simultaneously with the other indicators on the car. The circuit connection, however, in this case would be the same as that made for the rear indicator for the reason that the indicator on the dashboard and that on the rear of the car would be operated in a direction opposite to that of the indicator positioned on the front of the vehicle.

In operation, assuming that it is desired to turn to the left, the operator merely presses switch 38 on the steering wheel which energizes the electromagnet 26, thus attracting the armature 22 to the right and positioning the indicating member 19 pointing to the left and extending in a horizontal plane. At the same time the opening 34 in the rotary housing 14 comes into registry with the light 30 and through the medium of the red glass panel 36 covering this opening the rotary casing is flooded with red light which completely illuminates the indicating member 19 with a red glow positively designating a left turn. When the vehicle proceeds straight ahead after the turn, upon release of the switch 38, the armature will return to its normal position consequently turning shaft 15 and attached rotary housing and thus positioning the indicating member 19 in vertical normal position, as illustrated in Figure 4. When a right turn is made the switch 37 is operated and upon the rotary casing turning to the right disposing the indicating member 19 horizontally and pointing right, the opening 35 comes into registry with the light 30 and by reason of the fact that the panel 36 in opening 35 is green the rotary housing will be flooded with a green light corresponding to a right turn.

It will thus be seen that I have provided a very simple type of direction indicator which may be positively operated to indicate a right or left turn in a very definite manner in that apart from an illuminated indicator disclosing the direction it is intended to take, the direction indicator is illuminated with a different coloured light corresponding to the necessary turns which have to be made so that there is no possibility of mistaking the signal.

Furthermore, in view of the few parts used and the fact that the indicator is operated directly to rotate the rotary housing during operation, there are very few wearing parts and therefore the indicator will operate with practically no wear.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim as my invention is:

1. A direction indicator comprising a casing having one end open, a rotatable shaft mounted on said casing, a rotary indicator mounted on said shaft within the casing, said indicator included a housing formed with an open side having therein an opaque face plate with an indicating symbol cut out therefrom, and a translucent covering for said indicating symbol, said housing being positioned with the plate and indicating symbol facing the open end of the casing, means for selectively operating said housing to different predetermined positions, a lamp carried within the casing, and said housing having openings, each having a different coloured glass panel to cooperate with said lamp for illuminating the indicating symbol in a different colour for each position.

2. A direction indicator comprising a casing having one end open, a rotatable shaft mounted in the casing carrying a housing formed at the side facing the open end of the casing with an opaque face, said face having an opening therein of a contour to represent an indicating symbol, means for selectively rotating said housing to different predetermined positions, said housing being enclosed within the casing, a lamp carried within the casing rearwardly of the housing; and said housing having openings, each having a different coloured glass panel to cooperate with said lamp for illuminating the indicating symbol in a different colour for each position.

3. A direction indicator comprising a casing having one end open, a rotary housing mounted within the casing, an indicator carried by the housing and facing the open end of the casing, means for rotating the housing to a plurality of predetermined positions, said housing having a plurality of openings therein, one for each position, a different coloured glass panel mounted over each of said openings, and means mounted on said casing for projecting light through any one of said panels when moved to said predetermined positions whereby said indicator is illuminated in a different colour for each of said positions.

4. In a direction indicator a casing having one end open, a rotatable housing mounted in the casing on a shaft carried thereby, an indicator carried by the housing and facing the open end of the casing, means for rotating the housing to a plurality of predetermined positions, a lamp carried within the casing, and said housing having openings, each having a different coloured glass panel to co-operate with said lamp for illuminating the indicator in a plurality of colours, one for each position.

5. In a direction indicator a casing having one end open, a rotatable housing mounted in the casing on a shaft carried thereby, an indicator carried by the housing and facing the open end of the casing, means for rotating the housing to a plurality of predetermined positions, a lamp carried within the casing rearwardly of said housing, said housing having a plurality of openings covered by glass panels, each of said openings being positioned on the housing to correspond with one of the predetermined positions and to register with said lamp when in said position, said panels being of different colours whereby said housing and indicator is flooded with a different coloured light upon registration of each panel with said lamp.

6. A device as claimed in claim 5 in which means is provided in connection with said lamp for directing the light on a panel registering therewith.

ROBERT SAMUEL STUBBS.